(12) United States Patent
Dippel

(10) Patent No.: US 12,285,799 B2
(45) Date of Patent: *Apr. 29, 2025

(54) APPARATUS, SYSTEM AND METHOD OF COATING ORGANIC AND INORGANIC PRINT MATERIALS

(71) Applicant: JABIL INC., St. Petersburg, FL (US)

(72) Inventor: Nicholas Dippel, St. Petersburg, FL (US)

(73) Assignee: JABIL INC.

( * ) Notice: Subject to any disclaimer, the term of this patent is extended or adjusted under 35 U.S.C. 154(b) by 498 days.

This patent is subject to a terminal disclaimer.

(21) Appl. No.: 17/299,819

(22) PCT Filed: Dec. 4, 2019

(86) PCT No.: PCT/US2019/064544
§ 371 (c)(1),
(2) Date: Jun. 4, 2021

(87) PCT Pub. No.: WO2020/117984
PCT Pub. Date: Jun. 11, 2020

(65) Prior Publication Data
US 2022/0025210 A1    Jan. 27, 2022

Related U.S. Application Data

(60) Provisional application No. 62/775,087, filed on Dec. 4, 2018.

(51) Int. Cl.
*B22F 1/102* (2022.01)
*B22F 10/14* (2021.01)
(Continued)

(52) U.S. Cl.
CPC .............. *B22F 1/102* (2022.01); *B22F 10/14* (2021.01); *B22F 10/28* (2021.01); *B22F 10/34* (2021.01);
(Continued)

(58) Field of Classification Search
CPC ..... B29C 64/40; B29C 64/153; B29C 64/165; B33Y 70/00; B33Y 70/10; B33Y 80/00; B29K 2075/00; B22F 10/28
See application file for complete search history.

(56) References Cited

U.S. PATENT DOCUMENTS 11,511,488 B2   11/2022   Grebe
2006/0251826 A1*   11/2006   Pfeifer .................. B01J 2/16
427/212

(Continued)

FOREIGN PATENT DOCUMENTS

CN    107383244 A    11/2017
EP    2295390    2/2015

(Continued)

OTHER PUBLICATIONS

"Chemical Properties of Technical Ceramics", 2023, CoorsTek, https://www.coorstek.com/en/materials/chemical-properties-of-technical-ceramics/ (Year: 2023).*

(Continued)

*Primary Examiner* — Jasper Saberi
(74) *Attorney, Agent, or Firm* — Riverside Law LLP

(57) ABSTRACT

The disclosed exemplary apparatuses, systems and methods may provide a pulverant suitable to provide a three-dimensional molding by use of the pulverant in a layer-by-layer additive manufacturing process in which regions of respective layers of pulverant are selectively melted via introduction of electromagnetic energy. The pulverant may comprise a spray dried, thermoplastic polyurethane polymer (TPU) coated, inorganic or organic base particle.

20 Claims, 7 Drawing Sheets

(51) Int. Cl.
| | |
|---|---|
| *B22F 10/28* | (2021.01) |
| *B22F 10/34* | (2021.01) |
| *B33Y 40/10* | (2020.01) |
| *B33Y 70/00* | (2020.01) |
| *B33Y 70/10* | (2020.01) |
| *C09D 7/20* | (2018.01) |
| *C09D 7/40* | (2018.01) |
| *C09D 7/62* | (2018.01) |
| *C09D 7/65* | (2018.01) |
| *C09D 175/04* | (2006.01) |
| *B22F 10/322* | (2021.01) |
| *B33Y 80/00* | (2015.01) |

(52) U.S. Cl.
CPC ............... *B33Y 40/10* (2020.01); *B33Y 70/00* (2014.12); *B33Y 70/10* (2020.01); *C09D 7/20* (2018.01); *C09D 7/62* (2018.01); *C09D 7/65* (2018.01); *C09D 7/70* (2018.01); *C09D 175/04* (2013.01); *B22F 10/322* (2021.01); *B33Y 80/00* (2014.12)

(56) References Cited

U.S. PATENT DOCUMENTS

| | | | |
|---|---|---|---|
| 2007/0267784 A1* | 11/2007 | Greiner | B29C 64/153 425/87 |
| 2011/0020630 A1 | 1/2011 | Gladysz | |
| 2013/0012643 A1 | 1/2013 | Monsheimer | |
| 2014/0182170 A1 | 7/2014 | Wawrousek | |
| 2015/0314894 A1 | 11/2015 | Mazed | |
| 2016/0166011 A1 | 6/2016 | Bruce | |
| 2016/0229975 A1 | 8/2016 | Noordegraaf | |
| 2016/0243873 A1 | 8/2016 | Kim | |
| 2016/0326284 A1 | 11/2016 | Farrugia | |
| 2017/0008233 A1* | 1/2017 | Vontorcik, Jr. | C08G 18/4277 |
| 2017/0028475 A1 | 2/2017 | Heikkila | |
| 2017/0051121 A1 | 2/2017 | Prissok | |
| 2017/0260426 A1* | 9/2017 | Zhang | H01B 1/18 |
| 2017/0303633 A1 | 10/2017 | Hopkins | |
| 2018/0230590 A1 | 8/2018 | Farquhar | |
| 2018/0305536 A1 | 10/2018 | Harrison | |
| 2018/0319078 A1 | 11/2018 | Ederer | |
| 2018/0319708 A1 | 11/2018 | Haque | |
| 2018/0327557 A1 | 11/2018 | Jaeckel | |
| 2018/0345576 A1* | 12/2018 | Constantinou | C08J 9/16 |
| 2019/0338106 A1* | 11/2019 | Kunc | C08K 7/06 |
| 2019/0344496 A1 | 11/2019 | Bartow | |
| 2020/0156291 A1* | 5/2020 | Iguchi | B29C 43/18 |
| 2020/0307085 A1 | 10/2020 | Grebe | |
| 2022/0048244 A1* | 2/2022 | Van Benthem | B29C 64/165 |

FOREIGN PATENT DOCUMENTS

| | | |
|---|---|---|
| JP | 2017149086 A | 8/2017 |
| WO | 2016145301 A1 | 9/2016 |
| WO | 2018108781 | 6/2018 |

OTHER PUBLICATIONS

"Acrylic aka PMMA Chemical Compatibility Chart", Aug. 13, 2020, ISM, https://www.industrialspec.com/resources/acrylic-aka-pmma-chemical-compatiblity-chart (Year: 2020).*

International Search Report for PCT/US2019/065079, dated Nov. 6, 2020.

Written Opinion of the International Searching Authority for PCT/US2019/065035, dated Apr. 21, 2020.

"3M Glass Bubbles K37", 2021, 3M,https://www.3m.com/3M/en_US/p/d/b40064628/#:~:text=3M%E2%84%A2%20Glass 20Bubbles%20K37%20are%20lightweight%20hollow%20glass%20microspheres,crush%20strength%20of%203%2C000%20psi.( Year: 2021).

"Powder Bed Fusion", Dec. 22, 2022, Immensa, https://immensa.io/powder-bed-fusion-sls-vs-slm-vs-ebm-vs-mjf-additive-manufacturing/ (Year: 2022).

"Powder Bed Fusion", 2022, Immensa, https://immensa.io/powder-bed-fusion-sls-vs-slm-vs-ebm-vs-mjf-additive-manufacturing ( Year: 2022).

"Solvents", 2021, ThermoFisher Scientific, https://www.thermofisher.in/chemicals/en/brands/qualigens/solvents.html#:~:te Nonpolar%20solvents%20include%20alkanes%20(pentane,%2C%20methylene%20chloride%2C%20and%20pyridine.(Year: 2021 ).

International Search Report for PCT/US2019/065035, dated Nov. 6, 2020.

Office Action (Final Rejection) dated Dec. 26, 2023 for U.S. Appl. No. 17/311,655 (pp. 1-29).

Office Action (Final Rejection) dated Dec. 26, 2023 for U.S. Appl. No. 17/311,671 (pp. 1-18).

Written Opinion of the International Searching Authority for PCT/US2019/065035, dated Nov. 6, 2020.

"What is Syntactic Foam?", 2003, Engineered Syntactic Systems, https://ess.globecomposite.com/what-is-syntactic-foar (Year: 2003) 3 pages.

Office Action (Non-Final Rejection) dated May 16, 2024 for U.S. Appl. No. 17/311,655 (pp. 1-28).

Office Action (Non-Final Rejection) dated May 20, 2024 for U.S. Appl. No. 17/311,671 (pp. 1-21).

* cited by examiner

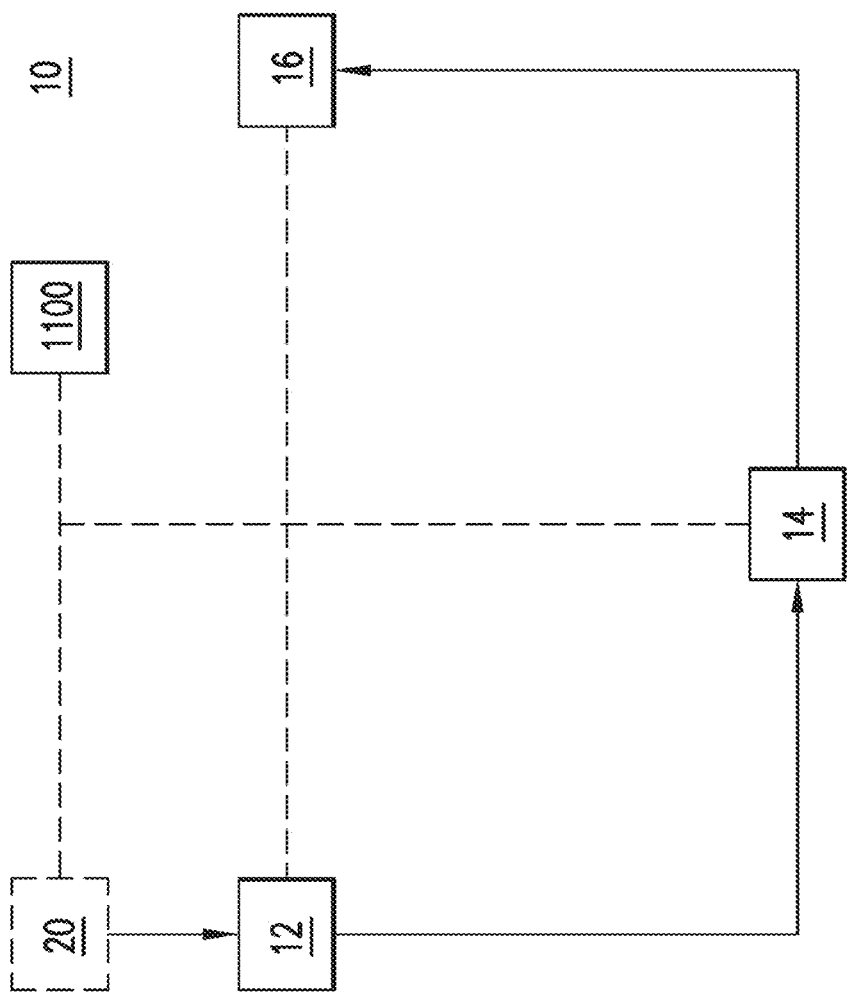

APPARATUS, SYSTEM AND METHOD OF COATING ORGANIC AND INORGANIC PRINT MATERIALS

CROSS-REFERENCE TO RELATED APPLICATIONS

The present application claims benefit of priority to International Application No. PCT/US2019/064544, filed Dec. 4, 2019, entitled Apparatus, System and Method of Coating Organic and Inorganic Print Materials," which claims priority to U.S. Provisional Application No. 62/775,087, filed Dec. 4, 2018, entitled: "Apparatus, System and Method of Coating Organic and Inorganic Print Materials," the entirety of which is incorporated herein by reference as if set forth in its entirety.

BACKGROUND

Field of the Disclosure

The present disclosure relates to additive manufacturing, and, more specifically, to an apparatus, system and method of coating organic and inorganic print materials.

Description of the Background

Three-dimensional (3D) printing is any of various processes in which material is joined or solidified under computer control to create a three-dimensional object. The 3D print material is "added" onto a base, such as in the form of added liquid molecules or layers of powder grain or melted feed material, and upon successive fusion of the print material to the base, the 3D object is formed. 3D printing is thus a subset of additive manufacturing (AM).

A 3D printed object may be of almost any shape or geometry, and typically the computer control that oversees the creation of the 3D object executes from a digital data model or similar additive manufacturing file (AMF) file. Usually this AMF is executed on a layer-by-layer basis, and may include control of other hardware used to form the layers, such as lasers or heat sources.

There are many different technologies that are used to execute the AMF. Exemplary technologies may include: fused deposition modeling (FDM); stereolithography (SLA); digital light processing (DLP); selective laser sintering (SLS); selective laser melting (SLM); inkjet print manufacturing (IPM); laminated object manufacturing (LOM); and electronic beam melting (EBM).

Some of the foregoing methods melt or soften the print material to produce the print layers. For example, in FDM, the 3D object is produced by extruding small beads or streams of material which harden to form layers. A filament of thermoplastic, wire, or other material is fed into an extrusion nozzle head, which typically heats the material and turns the flow on and off.

Other methods, such as laser or similar beam-based techniques, may or may not heat the print material, such as a print powder, for the purpose of fusing the powder granules into layers. For example, such methods melt the powder using a high-energy laser to create fully dense materials that may have mechanical properties similar to those of conventional manufacturing methods. Alternatively, SLS, for example, uses a laser to solidify and bond grains of plastic, ceramic, glass, metal or other materials into layers to produce the 3D object. The laser traces the pattern of each layer slice into the bed of powder, the bed then lowers, and another layer is traced and bonded on top of the previous.

In contrast, other methods, such as IPM, may create the 3D object one layer at a time by spreading a layer of powder, and printing a binder in the cross-section of the 3D object. This binder may be printed using an inkjet-like process.

Of course, materials of variable densities may be subjected to AM. For example, foam, which is a low density printed product, is used in many different products, such as seats in automobiles or homes, shoe soles, and so on. Currently there are many methods used to create foam, such as injection molding, continuous dispensing, continuous lamination, dispensing with gas blowing agents, and the like. However, none of these methods are able to produce a foam part that possesses gradient properties throughout a single continuous foam while also providing the correct dimensions for a finished part.

For example, sheets of foam may traditionally be created, such as by chemical dispensing, cooled and/or processed, and cut to size as they pass along a long conveyor system. However, such a conveyer system takes up significant space, and the aforementioned process is highly inefficient and takes significant time.

There do exist elastomeric materials that are employed to form foams using additive manufacturing (AM) technologies. By way of example, known elastomerics include polymer foam made using AM and PU, PS, PVC, Phenolic, Polyolefin, Melamine, and other polymers and polymer blends. However, while these materials can provide desirable properties, such as may include mechanical, thermal, or electrical properties, by way of example, they typically do so at the detriment of other properties, such as density, hardness, compression set, and rebound, for example.

Moreover, there exist methods to produce complex lattice structures using AM processes that mimic the behavior of foam. However, while these technologies do allow for custom elastomeric parts, the varying properties throughout the structure are not inherent to the printed material. Further, the process is very slow, as the material takes significant time to form into the complex non-inherent structure.

Currently, the known art typically produces composite powders for additive manufacturing using dry blends and/or by exposure of core particles into compound fillers to form a polymer matrix, which may then be ground. However, using such methodologies, placing a coating around a core print material is very difficult. For example, it is typical that core materials, such as hollow glass particles, that may be coated to form foam particles, must be carefully and/or delicately processed. As such, the processing of such particles is slow, inefficient, and requires significant effort, and still fails to lead to coated or well-coated particles having the high sphericity needed for subsequent processing, such as advanced manufacturing printing.

Accordingly, various coating methods have been developed for the creation of additive manufacturing print materials, but such coating methods are not only exhaustive, expensive and inefficient, but, perhaps worse, are core material-specific. That is, the methods and coating materials used must be varied in direct accordance with the composition of the core material being coated.

SUMMARY

The disclosed exemplary apparatuses, systems and methods provide a three-dimensional foam molding, produced via a layer-by-layer additive manufacturing process in which regions of respective layers of pulverant are selectively melted via introduction of electromagnetic energy.

The disclosed exemplary apparatuses, systems and methods may also provide a pulverant suitable to provide the three-dimensional molding by use of the pulverant in a layer-by-layer additive manufacturing process in which regions of respective layers of pulverant are selectively melted via introduction of electromagnetic energy. The pulverant may comprise a spray dried, thermoplastic polyurethane polymer (TPU) coated, inorganic or organic base particle.

BRIEF DESCRIPTION OF THE DRAWINGS

The disclosed non-limiting embodiments are discussed in relation to the drawings appended hereto and forming part hereof, wherein like numerals indicate like elements, and in which:

FIG. 1 is an illustration of an additive manufacturing printing system;

DETAILED DESCRIPTION

Figure 2A:
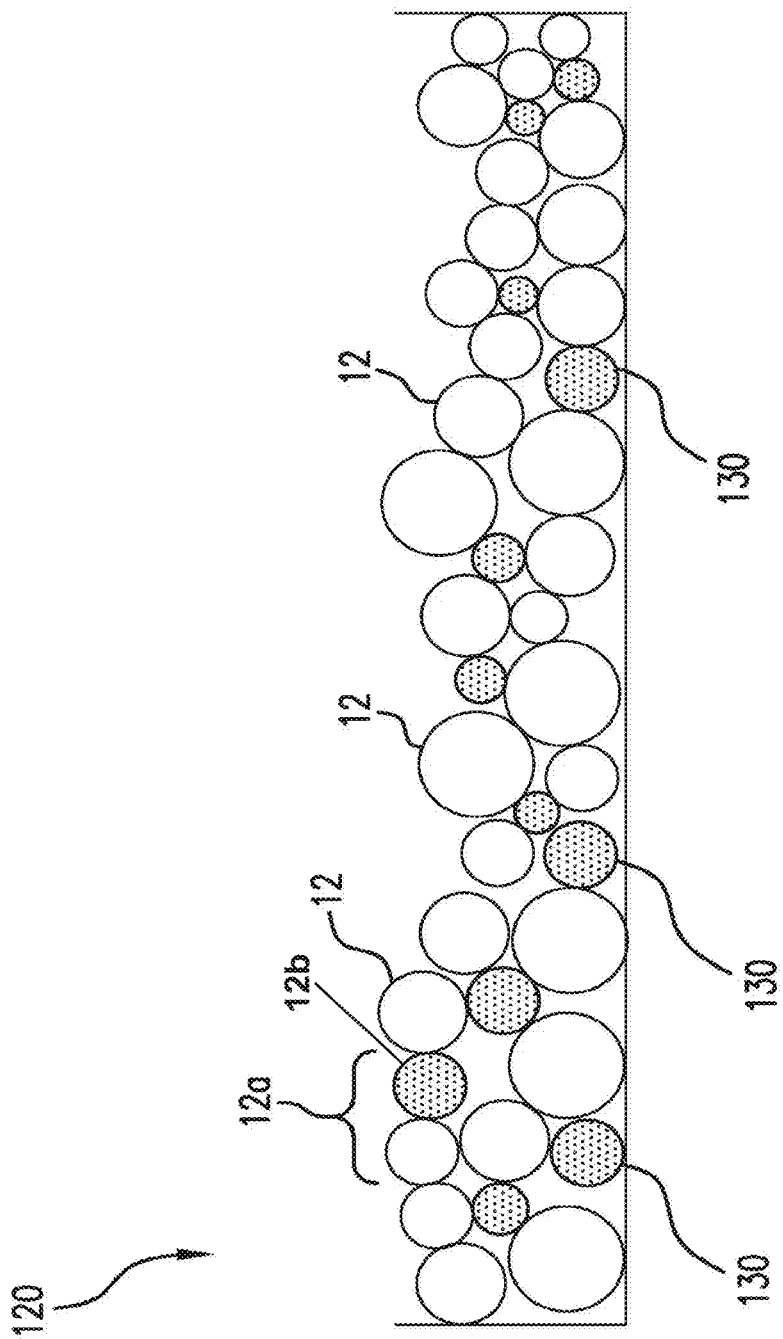
FIGS. 2A and 2B illustrate an exemplary print material compound.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "engaged to", "connected to" or "coupled to" another element or layer, it may be directly on, engaged, connected or coupled to the other element or layer, or intervening elements or layers may be present, unless clearly indicated otherwise. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

The disclosed apparatus, system and method provide materials, and enable the production of additively manufactured parts from those materials, having properties presently unavailable in the known art. Further, embodiments include designs for specification that may match and/or correlate particular print materials, print material fillers, and printed output objects given one or more processes available to produce the printed output object.

Historically, the use of additive manufacturing (AM), such as 3D printing, to produce parts having varying densities, such as a low density foam part, has been challenging and required custom machines and customized matching of materials. Contrary to the known art, the embodiments include materials and processes by which material is produced to more readily be used in existing AM technologies to produce parts of variable densities for various industries.

The embodiments may allow for a part to be printed from the provided print materials, and then selectively cut, crushed, or otherwise processed to create a final part. The part produced using AM can be printed very rapidly using existing AM printing technologies. Further, the inherent elastomeric properties are more controllable throughout the printed part, and can thus be further tailored during and after the printing, than the known art.

FIG. 1 illustrates a typical additive manufacturing (AM) system 10. In the illustration, a print material 12 is fed into a print process 14, such as the powder/pulverant-based AM processes discussed throughout, and the print process 14 outputs a printed 3D part 16. In the embodiments, the print material 12 may have the particular characteristics discussed herein, which may allow for the use of the print material 12 in any one or more processes 14, and which thereby result in any of various types of output parts 16 such as may have the characteristics discussed herein.

Additionally, computing system 1100 may execute one or more programs/algorithms 1190 to control one or more aspects of system 10, as referenced throughout. By way of example, program 1190 may be the AMF referenced herein above, and the AMF 1190 may independently control at least process 14. The AMF may additionally control the selection and/or distribution of print material 12, compounds 12a, and/or additives and fillers, and may further modify processes 14, print materials 12, and so on in order to achieve a user-desired print output 16, as discussed further herein below.

More particularly, the embodiments may include specifically TPU-coated organic and inorganic print materials 12. These materials 12 may include a TPU polymer coating on a core particle, such as an organic or inorganic microsphere, for example, and may additionally include one or more additives 20, such as may further enhance the operating characteristics and print operating windows discussed throughout the disclosure, and such as are discussed further herein below. It will be appreciated that, as used herein, "TPU" may further include any thermoplastic that is soluble in a solvent and that may be processable using the apparatus and process disclosed. The coating could also consist of or comprise any one of or any combination of the following: functionalization agents (for example, silanes), a non-TPU polymer, carbon nanotubes, metal flakes/whiskers, boron nitride, a solid coating, carbon black, a nanoclay, fumed metal oxides, pigments, a chain extender, flame retardants and/or a cross-linking agent.

Additionally, the core material may include (but is not limited to): solid glass beads, glass fibers, talc, nanoclay, carbon fibers, carbon black, metal oxides, copper metals, flame retardants, antioxidants, pigments, crosslinking agents, chain extender, a thermoplastic polymer powder, flow aids, hollow glass and/or ceramic microspheres (such as those made of soda-lime-borosilicate, perlite, sodium borosilicate (Eccospheres), alumino-silicate microspheres (Cenospheres), clay), plastic microspheres (such as those based on phenolic and amino polymers, those that are made of a copolymer such as vinylidene chloride, acrylo-nitrile or methyl methacrylate that encapsulates a hydrocarbon blowing agent such as isobutene or isopentane). Carbon spheres may also be used, such as carbon nanotubes bonded to the surface of a polymer microsphere or those made from the graphitization or pyrolysis of polymer spheres. The foregoing materials may be used alone or in combination.

The combination of a polymer matrix with microspheres to form a syntactic foam. In an illustrative embodiment, microsphere sizes range from about 1 to 200 μm. Additional coating and functionalization of the microsphere is possible through the addition of a coating of a metal such as aluminum, silver, copper, stainless steel, platinum, zinc or gold. Crush-strength of spheres can be tuned by defining the wall thickness and particle size distribution of the light weighting filler used. Hollow epoxy spheres may also be utilized.

As referenced, the disclosed print input materials 12 may be used in powder-based AM processes 14, such as those in which the powder 120 including the material 12 may be spread, melted in a targeted manner, and/or allowed to or processed to solidify, thus forming successive layers that result in a three-dimensional output object/part 16 having the characteristics discussed herein as indicative of both the process 14 and the input print material 12. Processes 14 may include, but are not limited to: Selective Laser Sintering (SLS), Selective Laser Melting (SLM), Selective Heat Sintering (SHS), High Speed Sintering (HSS), Multi Jet Fusion (MJF), Binder Jetting (BJ), Material Jetting (MJ), Laminated Object Manufacturing (LOM), and other AM technologies referenced herein, and/or AM technologies that utilize thermoplastic powders/pulverants as may be known to the skilled artisan. It will also be understood to the skilled artisan that other AM and similar processes 14 may be modified to employ the print materials 12 disclosed herein, including but not limited to injection molding, roto molding, vacuum molding, subtractive manufacturing, blow molding and so on.

As referenced above, and referring now specifically to FIG. 2A, additives 130 may be included with material 12 in forming powder 120. Additives 130 may provide desired characteristics to powder 120, may enable or improve aspects of processes 14, or may provide desired characteristics to output part 16 produced by exposure of the input print material 12 to process 14. Moreover, additives 130 may enable the particular characteristics of input print material 12 discussed herein. Additives 130 may include, by way of non-limiting example, glass beads, glass fibers, carbon fibers, carbon black, metal oxides, copper metals, flame retardants, antioxidants, pigments, powder flow aids, inks, and so on. For example, ink additives 130 may allow for modification of print material 12 properties, such as may provide for different functional inks for use in multi-jet fusion AM printing or high speed sintering.

More particularly, the disclosure includes AM "printed" output objects 16 that are printed from a coated print material 12. As referenced above with respect to FIG. 2A, such a print material 12 may be formed of combined particles 12a, wherein interstitial ones 12b of the combined particles may be sacrificial or low density such that, when combined with others in a combined particle print powder 120, the combined print material 12 may provide a variable density of AM printed output. Ones of the combined particles 12a may also be compounds, such as discussed below with respect to FIG. 2B.

Figure 2B:
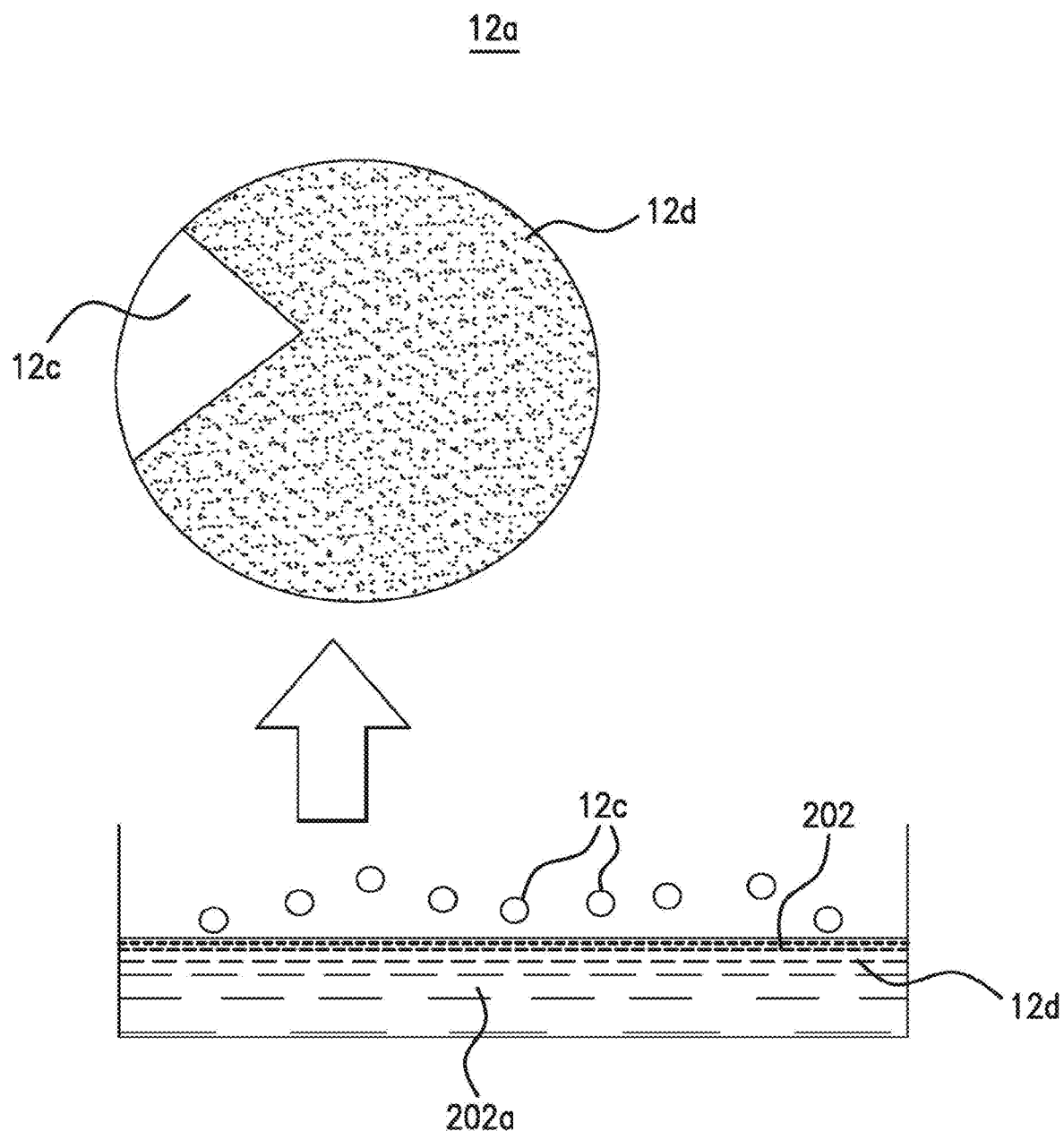

That is and as is referenced throughout, FIG. 2B illustrates a compound print particle 12a, in which an organic or inorganic core inner-particle 12c, such as may or may not include a sacrificial inner particle, is "coated" with a polymer 12d, such as a TPU coating, as further detailed herein throughout. This coating 12d may be performed using any of the various methods discussed throughout, and results in a compound print particle 12a for use in the various AM processes 14 discussed throughout.

More particularly, and by way of non-limiting example, a coating substance 12d may be placed into solution 202 to be coated onto a base particle 12c. As noted, in embodiments the base particle 12c may be sacrificial in nature, i.e., may be a hollow or low density particle, such as a glass or polymer bead. In other embodiments for the purposes of this disclosure, the base particle 12c may be air or gas, i.e., may constitute the absence of a solid particle, and thereby an introduction of porosity into a "coating" particle 12d. Inorganic or organic base particles may be or include at least one of an ore material; a low density filler, such as a glass bead, a hollow glass bead, or a polymeric balloon, for example; alumina, a metal oxide, a metal, a talc, an antioxidant (which may be organic, such as phenolic, or inorganic, such as a copper salt; a halogen or phosphorus compound; or a Bruggerman antioxidant, by way of non-limiting example.

The solvent 202a may be, for example, a liquid or gas that serves as the medium for the coating reaction. The solvent 202a may be non-participatory with the reactants in the solution 202, wherein the solvent 202a does not participate in the reaction; or participatory, wherein the solvent 202a may be, for example an acid (proton), a base (removing protons), or a nucleophile (donating a lone pair of electrons), and may thereby contribute to the coating reaction.

Further, solvents 202a may be polar or non-polar, and may further be subjected to inversion as to polarity. Polar solvents have large dipole moments—that is, they contain bonds between atoms with very different electronegativities, such as oxygen and hydrogen. Non-polar solvents contain bonds between atoms with similar electronegativities, such as carbon and hydrogen, which thus lack partial charges, i.e., which thus lack polarity. Polarity inversion may include enhancing solvent properties, such as to produce porous "coated" particles as discussed throughout.

Coating materials 12d may preferably be soluble in the selected solvent 202a, but the solvent 202a may preferably not have an effect on core particle 12c. By way of non-limiting example, a coating material soluble in a solvent 202a (e.g., water, THF, MEK, cyclohexanone) may preferably precipitate out of the solvent 202a upon drying. Thereby, for example, a polymer-based substance with characteristics of common engineering thermoplastics may be appropriate for use as coating material 12d in an organic solvent 202a in the disclosed embodiments. More specifically, for example, a 1-5 µm coating 12d onto core material 12c, such as using the fluidized bed process discussed herein, might comprise coating PC onto PMMA, or TPU onto hollow glass spheres. A coating with a thickness greater than 5 µm may be applied. A coating less than 1 µm may be applied, for example when coating with nanoparticles such as carbon black. In some embodiments, multiple successive coatings may be applied. The successive coatings may have different compositions, compared to the previously applied coatings. For example, a glass bead core material may be first coated with a silane or other surface functionalization agent and subsequently coated with a coat of polymer. Alternatively, multiple coatings of the same coating may be applied to a core material to achieve a desired coating thickness.

For different applications, the soluble coating material 12d may vary in accordance with the application in the disclosed embodiments. For example, foam-centric applications may employ an elastomeric coating material 12d having high elongation, substantial rebound, and adequate compression. By way of non-limiting example, for footwear parts, such elastomeric materials 12d may be particularly common. Applicable elastomeric compounds may include: styrene block copolymers, thermoplastic olefins, elastomeric alloys, thermoplastic polyurethanes, thermoplastic copolyesters, thermoplastic polyamides, ethylene-vinyl acetate, ethylene propylene rubber, ethylene propylene diene rubber, polyurethanes, silicones, polysulfides, elastolefins, high density polyethylene, low density polyethylene, linear low density polyethylene, polypropylene, polyolefin copolymers, polystyrene, polystyrene copolymers, polyacrylates, polymethacrylates, polyesters, polyvinylchloride, fluoropolymers, liquid crystal polymers, polyamides, polyether imides, polyphenylene sulfides, polysulfones, polyacetals, polycarbonates, polyphenylene oxides, polyurethanes, thermoplastic elastomers, epoxies, alkyds, melamines, phenolics, ureas, vinyl esters, liquid crystal polymers and/or combinations thereof.

In embodiments, the coating may be matched to one or more of the solvent used 202a, the core material 12c to be coated, and the print material 12 ultimately desired, rather than being uniquely matched to all of the foregoing as would be required in the known art. The core particle 12c may be a unitary particle type, a compound particle, or a particle blend, by way of example. Inorganic core materials 12c may comprise one or more of ore materials, glass beads, hollow glass beads, alumina, metal oxides, metals, talc, and so on. Organic core materials 12c may comprise one or more of hollow polymer spheres, wood/paper pulp, polymer spheres, any powder that is incompatible enough with the solvents chosen as to not dissolve into the solution 202, and so on. Core particles 12c may act as nucleation sites. For example, core particles may act as nucleation sites to increase the crystallinity in a polymer coating as the coating cools and dries on the core particle. High surface area metal oxides such as titanium oxide (titania) or silicon dioxides may be used as core particles to increase the crystallinity in a polymer coating as the coating cools and dries on the core particle.

Figure 3:
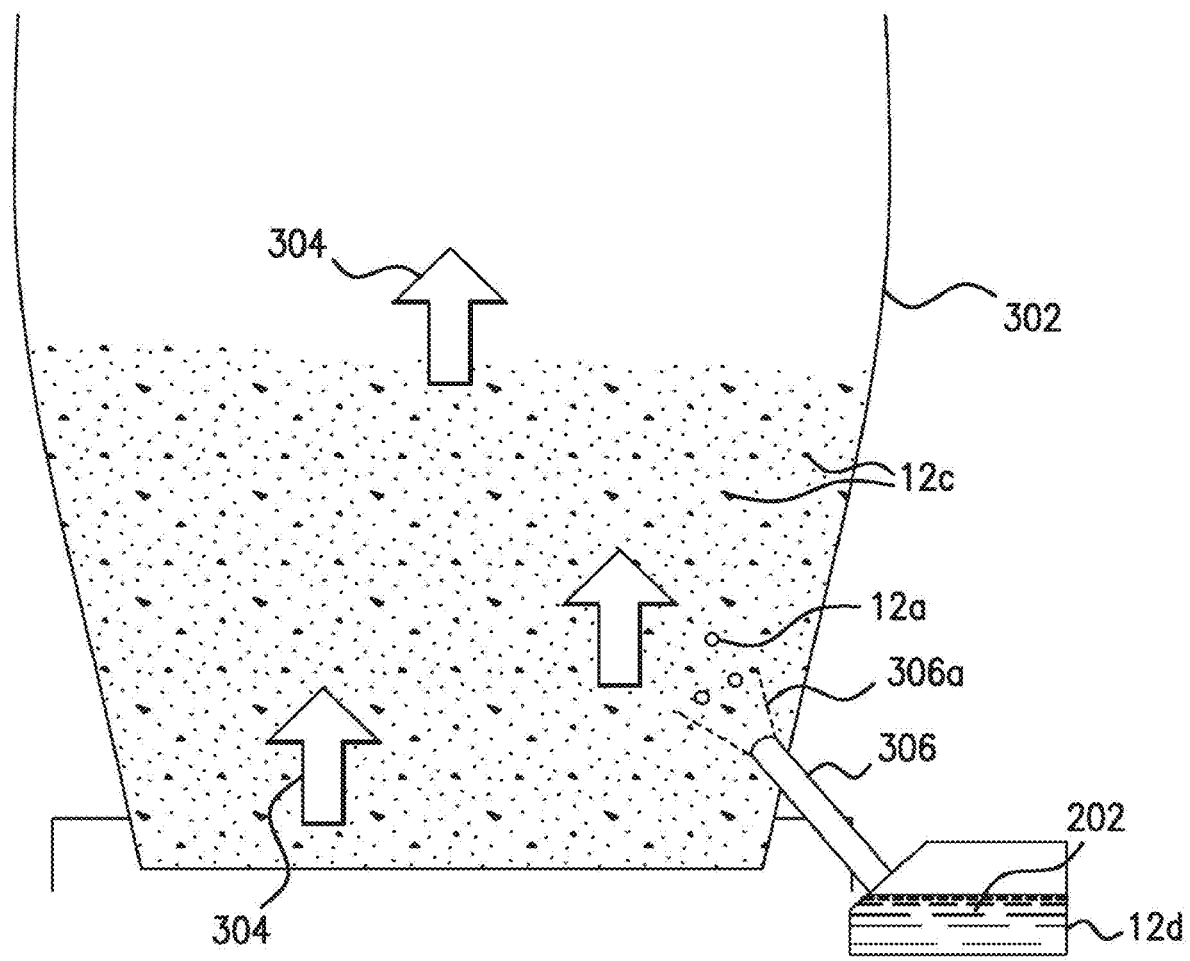
FIG. 3 illustrates print particle formation.

By way of example and as illustrated in FIG. 3, particles 12c may be placed in a vessel 302 and fluidized 304, such as using a gas 304 with controlled flow, in a fluidized bed coating process. More particularly, a spray nozzle/slurry atomizer 306 inside the vessel 302 may spray 306a a solution 202 containing the selected coating 12d and any necessary or desired solvents, dispersants or additives, onto fluidized ones of the core particles 12c. The solution 202 may comprise an atomized solution/slurry, such as a polymer slurry.

Also, a heated high shear mixer may be used to coat base particles with coating. For example, the high shear mixer may be heated from 20° C. to 350° C. Coating and base particles may be added simultaneously to the high shear mixer before mixing. Alternatively, base particles may be first loaded into a high shear mixer and the high shear mixer may start to mix in the absence of coating. Coating may be added or sprayed into the high shear mixer to coat the previously loaded base particles. The high shear mixer may function to dry a coating onto a base particle.

The solution 202, evaporated aspects of the solution 202, and/or the fluidization chamber may be heated and/or subjected to a vacuum as needed in order to support the coating, drying, and/or collection processes discussed herein. Likewise, the core particles 12c may be heated to enhance the processes discussed herein. The foregoing may advantageously support coating 12d on the outside of organic or inorganic core particles 12c, and, more particularly, uniformity and desired depth of coating 12d onto the outer aspects of core particle 12c.

Upon coating, the combined/compound print particles 12a may be actively dried, such as after or during the fluidization and/or spraying. This spray process may be repeated, such as until all the print particles 12a have been coated and dried. Once dried, the coated particles 12a may be collected, and may be further processed, such as by additional drying, post-process particle treatment, or the like, as and if needed. Such post-processing may include de-agglomeration, mixing, addition of additives 130, and the like.

Figure 4:
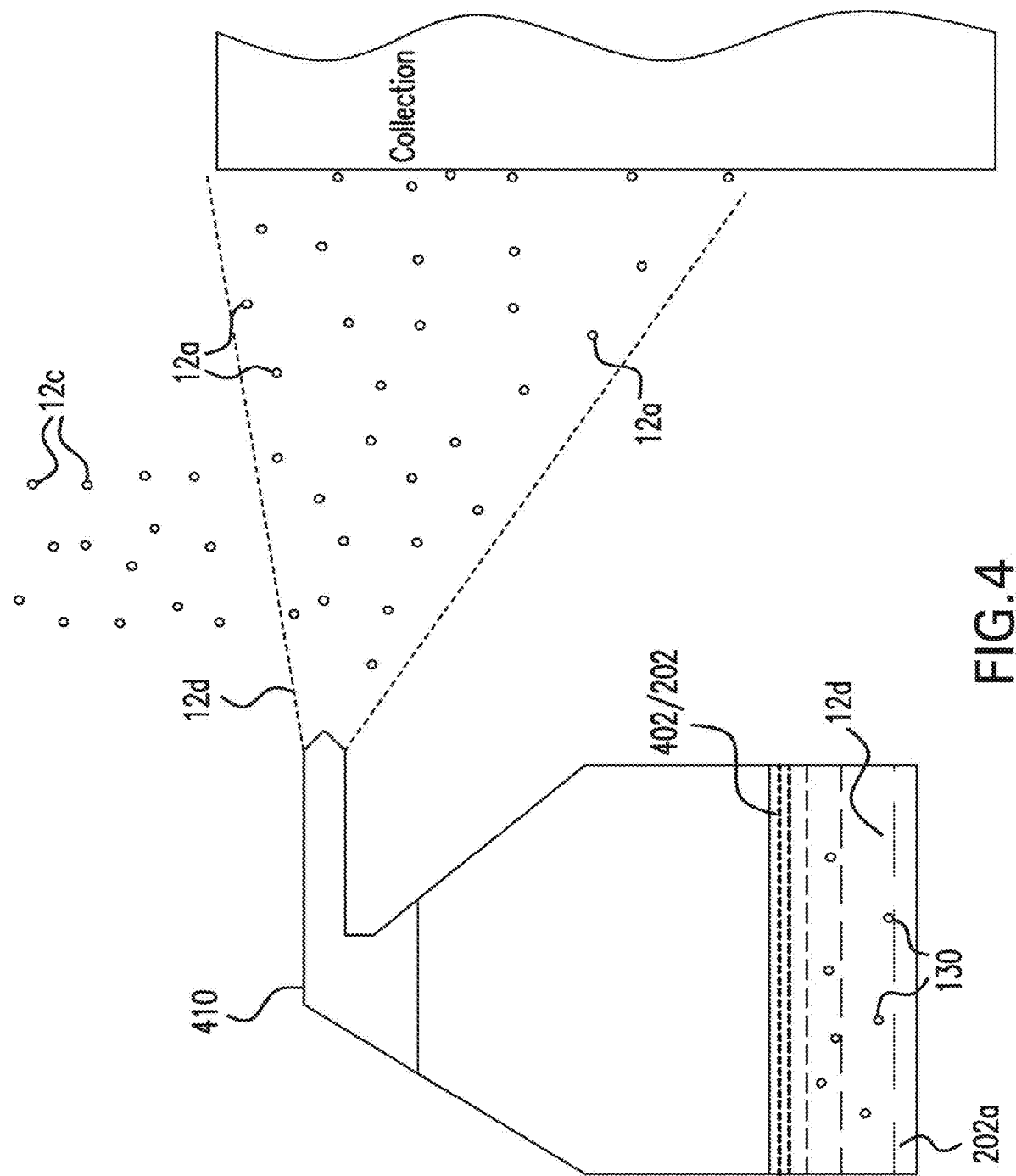
FIG. 4 illustrates print particle formation.

Additionally and alternatively, spray drying may be used to coat the core particles 12c, as illustrated in FIG. 4. By way of example, a liquid feed solution 202 may be made by dissolving a shell material, such as a polymer, 12d into a suitable solvent(s) 202a. By way of example, thermoplastic polyurethane may be dissolved in NMP, or polycarbonate may be dissolved in NMP.

The dissolving process for forming solution 202 may involve the application of heat or pressure into the solution chamber, and/or may include mixing or stirring, which may be vigorous, such as to reach homogeneity. Of note, and particularly in light of the prospective application of heat to form solution 202, the stability of the polymer 12d in the solvent 202a, once at temperature, must be controlled, such as using the controlling computing algorithm 1190 discussed herein. Likewise, and given the stirring and/or mixing that may be performed as referenced above, the viscosity of the solution 202 must also be controlled to an appropriate level for the remainder of the process.

Added to the solution/slurry 202 may be any dispersants or other additives 130. By way of non-limiting example, co-solvents may be added to aid in processing; precipitation liquids or solids may be added to facilitate a cloud point; and/or additives may be provided to facilitate generation of nucleation sites. Upon the addition of certain types of additives 130, only low shear forces may be applied, such as so as to not damage delicate spherical additive particles in solution 202. Accordingly, low shear mixing methods may be used in certain embodiments.

The solution/slurry 202 may then be may be fed into a sprayer/dryer 410, such as while the solution is being gently agitated/mixed, as referenced above. The sprayer/dryer 410 may include an atomizer mechanism, such as an atomizer disc and a nozzle spray head 410a, or other like-technology, to atomize the provided liquid feed. For example, the atomizer may use heat, pressure, a spinning disc, colliding fluid/gas and/or pressurized streams, and/or counter-rotating rollers, to produce the atomized spray. Of course, pumping mechanisms used may vary in accordance with the knowledge of one skilled in the pertinent arts.

Parameters of interest to provide the liquid feed spray may include, but are not limited to: inlet temperature, exhaust temperature, HEPA pressure, chamber pressure, cyclone pressure, bagfilter pressure, disc rotating speed, liquid volume ml/min, and so on. The spray head 410a may have one or multiple feed channels pursuant to these parameters of interest, which may provide uniform or different composition solutions. The feed channel or channels may be heated or pressurized.

The solution spray 202 may be dried as it is atomized, to thereby form a coating 12d onto the core particles 12c. It may be preferred that only individual spherical core particles 12c are coated in the embodiments, and thus it may be desirable that agglomeration is kept to a minimum. This de-agglomeration may be accomplished, in part by engineering design of the coating chamber.

More specifically, the chamber, the heat level or levels therein, and the gas circulation rate thereabout, at various points may be tuned to facilitate the evaporation of the solvent and the precipitation of the coating 12d out of the solution 402 and onto the organic or inorganic core material 12c. By way of example, and as shown, multiple heating zones 440a, b, c may be provided to quickly evaporate the solvent and to, in part control precipitation of the coating. This may also allow for directional and staged heating, by way of example. Further, control algorithm 1190 may control gas flow, such as in one or more zones, to optimize evaporation of the solvent.

The dried, powdered print material 12a may then be collected using known methodologies. Paddle, belt and screen drying may also be used in the embodiments, wherein, in each such case, the process is similar to that discussed herein with respect to spray drying.

Collection methodologies may include pneumatic collection, such as a pull through cyclone, an air classifier, or the like. Additionally and alternatively, a simple gravity feed may collect the print particles 12a into a collection container. Yet further, the foregoing and other methodologies may be used for particle collection, either independently or in combination. Particle collection may additionally include screening the collected particles for desired size, density and/or sphericity. In screen drying, for example, the coating material 12d may be sprayed onto a screen or a rigid substrate that includes core particles 12c, and the screen or substrate may then be dried and the coated particles 12a harvested therefrom.

The coated print particles 12a thus created may additionally comprise flow agents, lubricants (such as silica gel), carbon black, or other additives needed to make the particles more "printable" in the selected AM technology. Yet further, coated print particles 12a may be packaged so as to retain the desired properties, such as being packaged to prevent overheating, to prevent any contact with chemicals, and/or to prevent accidental crushing.

Figure 5:
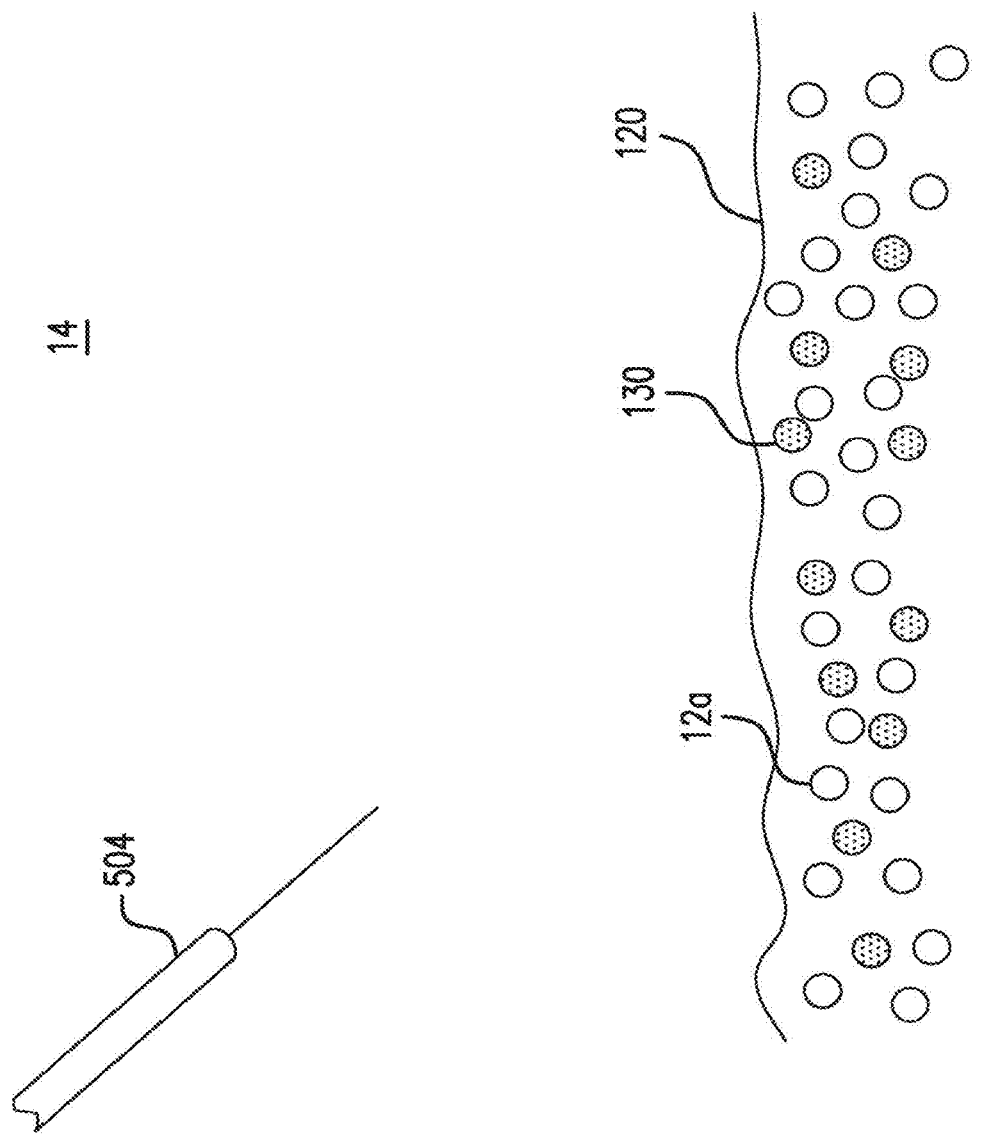
FIG. 5 illustrates TPU-coated materials printing.

Once the coated print particles 12a are created, they may be printed using an AM process 14, as illustrated in FIG. 5. The AM printing process 14 may use a laser 504, and thus may be, for example, a dry blend SLS print. In such an embodiment, the coated particles 12a may also be dry blended with additives 130, and the blended powder 120 may then be printed to a form 16, layer-by-layer, using an SLS printer as discussed above.

One example of using a dry-blended additives utilizes the combination of high shear and low shear mixing/blending. To disperse particles in a dry solid state, a high shear mixer is used to break up agglomerates and obtain a fluidized state of mixing. Care should be taken to avoid high temperatures. It may also be advantageous to form masterbatches or concentrates of additives with the powdered bulk resin. The concentrate (or masterbatch) is then blended, typically in a low shear blender, to disperse the additive and homogenize the blend.

Similarly, wherein the AM printing process is a powder bed fusion process, a single thin layer, such as an approximately 0.1 mm thick layer, of compound print material 12a in powder 120, such as may be created using the methodologies discussed above, may be spread over a build platform. The laser 504 may then fuse the first layer, or first cross section, of the model. Thereafter, a new layer of the compound print material 12a in powder 120 is spread across the previous layer, such as using a roller. Further layers or cross sections may then be added until the entire model is created. Loose, unfused powder print material may remain in position throughout, but may be removed during post processing, by way of non-limiting example.

Also in a manner similar to that of FIG. 5, binder jetting may use a "binder", rather than or in addition to a laser 504. In such an embodiment, the powder print material 12a may be spread over the build platform, such as using a roller. A print head may then deposit a binder adhesive on top of the powder where required. The build platform may then be lowered by the model's layer thickness. Another layer of powder may then be spread over the previous layer, and the object is formed where the powder is bound to the liquid, layer-by-layer.

A multijet fusion or high speed sintering methodology may operate in a manner similar to the powder bed fusion, but may employ heat lamps or similar technologies, rather than a laser. Likewise, in a directed energy deposition AM method, an axis arm with a nozzle may move around a fixed object, and the print material 12*a* may be deposited from the nozzle onto existing surfaces of the object. The material may be provided, by way of example, in wire/filament or powder form, and may be melted for dispersal from the nozzle using a laser, electron beam or plasma arc.

Various other methodologies may provide a suitable format for the combined/compound print particles 12*a* to enable or improve printing using AM technologies. For example, a sheet may be made from the combined/compound powder print materials, or a filament may be provided. Moreover, additives may be provided in the print material to enable or improve printing and/or object formation. Additive materials may include, but are not limited to, hollow metal oxide beads or hollow polymeric spheres.

In each such embodiment, parameters of interest for the combined/compound print material 12*a* may include parameters such as moisture level, heat of build chamber, heater power and temperature emitted, time of heat exposure, time between layers, recoating rate/thickness, feed rate, feed temperature, pressure and vacuum, gas flow rate, and the like. In short, the coating 12*d* on the core particle 12*c* melts, such as upon exposure to a laser or other source of electromagnetic energy, and thus fuses to nearby particles during an AM process. In some embodiments, the coating and the core particle melt upon exposure to a laser or other source of electromagnetic energy. As such, the print material 12*a* should be heated during the selected AM print process 14 past its respective coating's melting point, and should be subjected to a lowered modulus sufficient for the coating to flow. Under such circumstances, the respective polymer chains may suitably bond with those of the particle next to each particle, to form output 16. The selected AM print process 14 may allow that bond to cool, and thus the cooled particle chains form a solid layer in output 16. Of course, each print material 12 may also be subjected to additives 130 as discussed throughout, such as may aid with melting or flow during melting, with impact resistance, or with heat stabilization, by way of example, dependent upon the AM process selected.

As such, an output part 16 processed as described herein may provide correlated characteristics that are indicative of, and/or correlated to, the input material 12*a*, and which occur pursuant to application of AM process 14, as described herein throughout. Such correlated characteristics may be measured, by way of non-limiting example, by heat-flowing a sample of the input 12*a* and/or the output 16, and then measuring thermal characteristics of the heat-flowed sample, such as Tm, Tg, Tcryst, heat of fusion, and the like. Likewise, infrared microscopy may allow for identification of the wavelengths of the corresponding chemical structures of the input material and/or the output object layers. Yet further, a thermogravimetric or similar analysis may be performed on a sample of the input material 12*a* or printed output 16, and this analysis may further include measurement of the composition of decomposition gases as the sample degrades, by way of example.

Of course, in view of the aforementioned prospective correlation of characteristics between an input print material 12*a* and a printed output object 16, the correlated characteristics of output object 16 may vary dependently not only in accordance with the input material 12*a*, but additionally based upon the process 14 employed to print the print material 12*a* into the output object 16. Accordingly, one or more computing programs/algorithms 1190, such as may comprise one or more AMF files; one or more input material 12*a* and/or additive 130 choices; one or more process 14 choices and/or one or more process characteristics choices; and/or one or more output 16 shape, size, and/or characteristic choices, may be executed by a computing system 1100. This execution may occur, for example, pursuant to an instruction to a GUI, such as to provide a particular correlation as between a TPU-coated input material 12*a* and/or additives 130 and a specific output object characteristic, and/or to use a particular available input material 12, using an available process 14, to target the ultimate production of a particular output object 16. This is illustrated with particularity in FIG. 6.

Figure 6:
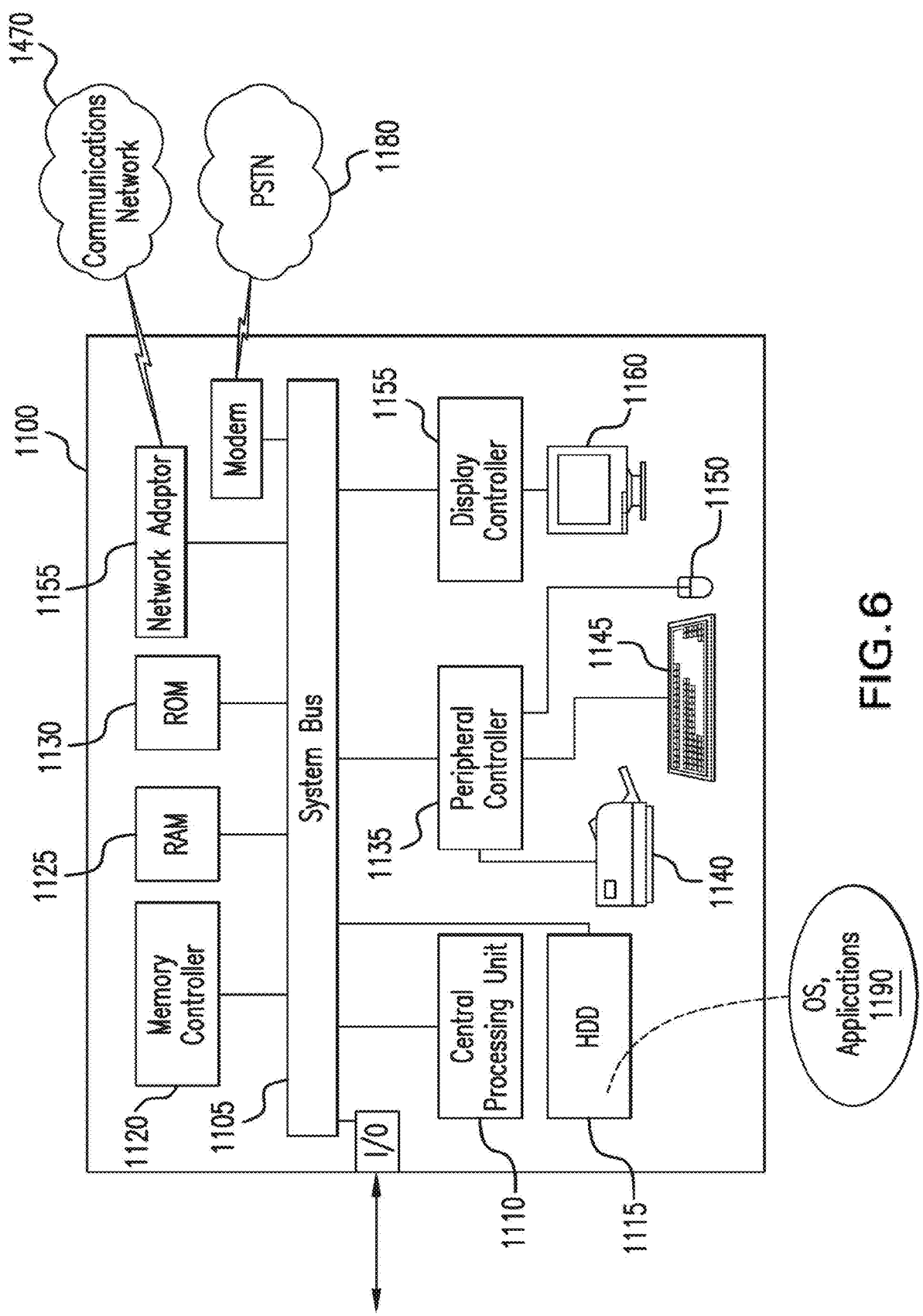
FIG. 6 illustrates an exemplary computing system.

More particularly, FIG. 6 depicts an exemplary computing system 1100 for use in association with the herein described systems and methods. Computing system 1100 is capable of executing software, such as an operating system (OS) and/or one or more computing applications/algorithms 1190, such as applications applying the algorithms discussed herein, and may execute such applications 1190 using data, such as materials and process-related data, which may be stored 1115 locally or remotely.

That is, the application(s) 1190 may access, from a local or remote storage locations 1115, different TPU powders, coatings, fillers and compounds, and interrelate those to powder-centric processes and output object characteristics. The application 1190 may then allow a user, such as using a GUI, to select, for example, an input material, and, such as based on user selection of a process and/or process characteristics to which the input material was to be subjected, to provide the user with a variety of characteristics of the output object characteristics. Of course, likewise, a user may select desired output characteristics, and may be able to select one or more processes and/or process characteristics, and may be provided with an input material (including compound and/or fillers) that may be needed to obtain he desired selected output using the selected process.

More particularly, the operation of an exemplary computing system 1100 is controlled primarily by computer readable instructions, such as instructions stored in a computer readable storage medium, such as hard disk drive (HDD) 1115, optical disk (not shown) such as a CD or DVD, solid state drive (not shown) such as a USB "thumb drive," or the like. Such instructions may be executed within central processing unit (CPU) 1110 to cause computing system 1100 to perform the operations discussed throughout. In many known computer servers, workstations, personal computers, and the like, CPU 1110 is implemented in an integrated circuit called a processor.

It is appreciated that, although exemplary computing system 1100 is shown to comprise a single CPU 1110, such description is merely illustrative, as computing system 1100 may comprise a plurality of CPUs 1110. Additionally, computing system 1100 may exploit the resources of remote CPUs (not shown), for example, through communications network 1170 or some other data communications means.

In operation, CPU 1110 fetches, decodes, and executes instructions from a computer readable storage medium, such as HDD 1115. Such instructions may be included in software, such as an operating system (OS), executable programs such as the aforementioned correlation applications, and the like. Information, such as computer instructions and other computer readable data, is transferred between components of computing system 1100 via the system's main data-transfer path. The main data-transfer path may use a system bus architecture 1105, although other computer architectures (not shown) can be used, such as architectures using serializers and deserializers and crossbar switches to communicate data between devices over serial communication paths. System bus 1105 may include data lines for sending data, address lines for sending addresses, and control lines for sending interrupts and for operating the system bus. Some busses provide bus arbitration that regulates access to the bus by extension cards, controllers, and CPU 1110.

Memory devices coupled to system bus 1105 may include random access memory (RAM) 1125 and/or read only memory (ROM) 1130. Such memories include circuitry that allows information to be stored and retrieved. ROMs 1130 generally contain stored data that cannot be modified. Data stored in RAM 1125 can be read or changed by CPU 1110 or other hardware devices. Access to RAM 1125 and/or ROM 1130 may be controlled by memory controller 1120. Memory controller 1120 may provide an address translation function that translates virtual addresses into physical addresses as instructions are executed. Memory controller 1120 may also provide a memory protection function that isolates processes within the system and isolates system processes from user processes. Thus, a program running in user mode may normally access only memory mapped by its own process virtual address space; in such instances, the program cannot access memory within another process' virtual address space unless memory sharing between the processes has been set up.

In addition, computing system 1100 may contain peripheral communications bus 1135, which is responsible for communicating instructions from CPU 1110 to, and/or receiving data from, peripherals, such as peripherals 1140, 1145, and 1150, which may include printers, keyboards, and/or the sensors discussed herein throughout. An example of a peripheral bus is the Peripheral Component Interconnect (PCI) bus.

Display 1160, which is controlled by display controller 1155, may be used to display visual output and/or other presentations generated by or at the request of computing system 1100, such as in the form of a GUI, responsive to operation of the aforementioned computing program(s). Such visual output may include text, graphics, animated graphics, and/or video, for example. Display 1160 may be implemented with a CRT-based video display, an LCD or LED-based display, a gas plasma-based flat-panel display, a touch-panel display, or the like. Display controller 1155 includes electronic components required to generate a video signal that is sent to display 1160.

Further, computing system 1100 may contain network adapter 1165 which may be used to couple computing system 1100 to external communication network 1170, which may include or provide access to the Internet, an intranet, an extranet, or the like. Communications network 1170 may provide user access for computing system 1100 with means of communicating and transferring software and information electronically. Additionally, communications network 1170 may provide for distributed processing, which involves several computers and the sharing of workloads or cooperative efforts in performing a task. It is appreciated that the network connections shown are exemplary and other means of establishing communications links between computing system 1100 and remote users may be used.

Network adaptor 1165 may communicate to and from network 1170 using any available wired or wireless technologies. Such technologies may include, by way of non-limiting example, cellular, Wi-Fi, Bluetooth, infrared, or the like.

It is appreciated that exemplary computing system 1100 is merely illustrative of a computing environment in which the herein described systems and methods may operate, and does not limit the implementation of the herein described systems and methods in computing environments having differing components and configurations. That is to say, the inventive concepts described herein may be implemented in various computing environments using various components and configurations.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A pulverant suitable to provide a three-dimensional low density foam by use of the pulverant in a layer-by-layer additive manufacturing process in which regions of respective layers of pulverant are selectively melted via introduction of electromagnetic energy, comprising:
   a spray dried, crystalline and porous thermoplastic polyurethane polymer (TPU) coated base particle; wherein the base particle acts as a nucleation site;
   wherein the base particle is an interstitial sacrificial particle, the sacrificial particle comprising at least one of a glass bead or a polymer bead having a gas therein to increase porosity in the TPU coating upon sacrifice of the sacrificial particle resulting in the low density of the low density foam;
   wherein the spray dried, TPU coating comprises one or more first additives to facilitate generation of the nucleation site; and
   wherein at least the nucleation site and the one or more first additives increase the crystallinity of the spray dried, TPU coating.

2. The pulverant of claim 1, wherein the coating comprises a solution.

3. The pulverant of claim 2, wherein the solution comprises a non-polar solvent that is non-reactive with the base particle and capable of enhancing the porosity.

4. The pulverant of claim 1, wherein the layer-by-layer additive manufacturing process comprises one of selective laser sintering (SLS), powder bed fusion, binder jetting and multijet fusion.

5. The pulverant of claim 1, further comprising one or more second additives.

6. The pulverant of claim 5, wherein the one or more second additives comprise at least one of glass beads, glass fibers, carbon fibers, carbon black, metal oxides, copper metals, flame retardants, antioxidants, pigments, and flow aids.

7. The pulverant of claim 1, wherein the base particle comprises a metal oxide, wherein a surface area of the metal oxide is sufficiently high to further increase the crystallinity of the spray dried TPU coating in conjunction with the one or more first additives.

8. A pulverant suitable to provide a three-dimensional low density foam by use of the pulverant in a layer-by-layer additive manufacturing process in which regions of respective layers of pulverant are selectively melted via introduction of electromagnetic energy, comprising:
   a spray dried, thermoplastic polyurethane polymer (TPU) coated base particle;
   wherein the base particle is a hollow particle;
      an interior of the hollow particle comprising a gas bubble to increase a porosity and thereby decrease a density of the low density foam by sacrificing an exterior of the hollow particle upon the introduction of the electromagnetic energy;
      wherein the spray dried, TPU coating comprises one or more first additives to facilitate generation of a nucleation site; and
      wherein at least the nucleation site and the one or more first additives increase crystallinity of the spray dried, TPU coating.

9. A pulverant suitable to provide a three-dimensional melding low density foam by use of the pulverant in a layer-by-layer additive manufacturing process in which regions of respective layers of pulverant are selectively melted via introduction of electromagnetic energy, comprising:
   a spray dried, porous thermoplastic polyurethane polymer (TPU) coated, organic or inorganic base particle, wherein the base particle comprises a unitary particle type or compound particle that is capable of lowering density upon the introduction of the electromagnetic energy to the TPU coating to thereby create the low density foam.

10. The pulverant of claim 9, wherein the base particle comprises an organic base particle comprising a hollow epoxy sphere coated with a metal.

11. The pulverant of claim 9, wherein the base particle comprises an inorganic antioxidant that acts as a nucleation site.

12. The pulverant of claim 9, wherein the coating comprises a solution.

13. The pulverant of claim 12, wherein the solution comprises a solvent that is non-reactive with the base particle.

14. The pulverant of claim 9, wherein the layer-by-layer additive manufacturing process comprises one of selective laser sintering (SLS), powder bed fusion, binder jetting and multijet fusion.

15. The pulverant of claim 9, further comprising one or more additives.

16. The pulverant of claim 15, wherein the one or more additives comprise at least one of glass beads, glass fibers, carbon fibers, carbon black, metal oxides, copper metals, flame retardants, antioxidants, pigments, and flow aids.

17. The pulverant of claim 9, wherein the base particle comprises an organic antioxidant comprising a phenolic antioxidant, and wherein the phenolic antioxidant acts as a nucleation site.

18. The pulverant of claim 17 further comprising:
   one or more first additives to facilitate generation of the nucleation site;
   wherein at least both (i) the nucleation site of the phenolic antioxidant and (ii) the one or more first additives increase the crystallinity of the spray dried, TPU coating.

19. The pulverant of claim 9, wherein the base particle comprises a polymer sphere, wherein the polymer sphere has carbon nanotubes bonded to the surface of the polymer sphere.

20. The pulverant of claim 9, wherein the base particle comprises a halogen compound or phosphorus compound.

* * * * *